US008912783B2

(12) United States Patent
Shinyama

(10) Patent No.: US 8,912,783 B2
(45) Date of Patent: Dec. 16, 2014

(54) POWER-SUPPLY CONTROLLER CIRCUIT AND IMAGE FORMING APPARATUS INCLUDING THE SAME

(75) Inventor: Hideki Shinyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 713 days.

(21) Appl. No.: 13/212,421

(22) Filed: Aug. 18, 2011

(65) Prior Publication Data

US 2012/0049832 A1 Mar. 1, 2012

(30) Foreign Application Priority Data

Aug. 27, 2010 (JP) ................................. 2010-190359

(51) Int. Cl.
*G05F 5/00* (2006.01)
*G03G 15/00* (2006.01)

(52) U.S. Cl.
CPC ......... *G03G 15/5004* (2013.01); *Y02B 60/1267* (2013.01)
USPC ........................................................ 323/299

(58) Field of Classification Search
USPC .................................. 323/299; 307/125, 126
See application file for complete search history.

(56) References Cited

U.S. PATENT DOCUMENTS

| | | | | |
|---|---|---|---|---|
| 7,315,097 | B2 * | 1/2008 | Tajika | 361/93.4 |
| 7,965,483 | B2 * | 6/2011 | Topucharla et al. | 361/93.2 |
| 2011/0115307 | A1 * | 5/2011 | Yoshie | 307/125 |
| 2012/0017103 | A1 * | 1/2012 | Abraham et al. | 713/320 |

FOREIGN PATENT DOCUMENTS

JP 2002-312073 A 10/2002

* cited by examiner

*Primary Examiner* — Jue Zhang
(74) *Attorney, Agent, or Firm* — Marvin A. Motsenbocker; MOTS LAW, PLLC

(57) ABSTRACT

A power-supply controller circuit includes: a power-supply switch unit configured to output an ON-signal when manually operated; a switching unit configured to switch ON and OFF an output voltage to a controller unit in response to the ON-signal of the power-supply switch unit; a latching unit configured to latch an ON-state of the switching unit, when the power-supply switch unit outputs an ON-signal under a condition where the switching unit is in an OFF-state; and the controller unit configured to control an unlatching signal to unlatch the ON-state latched by the latching unit when the latching unit is in the ON-state and detects the ON-signal sent from the power-supply switch unit.

11 Claims, 10 Drawing Sheets

POWER-SUPPLY CONTROLLER CIRCUIT AND IMAGE FORMING APPARATUS INCLUDING THE SAME

CROSS REFERENCE TO RELATED APPLICATIONS

This application claims priority based on 35 USC 119 from prior Japanese Patent Application No. 2010-190359 filed on Aug. 27, 2010, entitled "POWER-SUPPLY CONTROLLER CIRCUIT AND IMAGE FORMING APPARATUS INCLUDING THE SAME," the entire contents of which are incorporated herein by reference.

BACKGROUND OF THE INVENTION

1. Field of the Invention

The invention relates to a power-supply controller circuit, for example. An embodiment of the invention relates to a power supply controller circuit configured to control power supply to reduce current consumption to almost zero during non-operating time, and to an image forming apparatus including the power-supply controller circuit.

2. Description of the Related Art

In integrated circuits of recent years, power-supply controller-circuit blocks have been provided with a power-saving mode function to cut off power supply to circuit blocks not in use, because power saving to reduce the power supply has been desired in consideration of issues of the global environment, demands for extending drive-time of battery-using apparatus, and any other requirement.

The power saving integrated circuit disclosed in Japanese Patent Application Publication No. 2002-312073, for instance, includes a switching element to control the power supply to the circuit portion and a controller block to control the switching element. In this integrated circuit, the power is supplied to the controller block during non-operating time as well.

SUMMARY OF THE INVENTION

The technique described above, however, has achieved insufficient reduction in the power consumption.

An object of a first aspect of the invention is to reduce power consumption.

A first aspect of the invention is a power-supply controller circuit including: a power-supply switch unit configured to output an ON-signal when operated manually; a switching unit configured to switch ON and OFF an output voltage to a controller unit in response to the ON-signal of the power-supply switch unit; a latching unit configured to latch an ON-state of the switching unit, when the power-supply switch unit outputs an ON-signal under a condition where the switching unit is in an OFF-state; and the controller unit configured to control an unlatching signal to unlatch the ON-state latched by the latching unit when the latching unit is in the ON-state and detects the ON-signal sent from the power-supply switch unit.

A second aspect of the invention is an image forming apparatus including: a power supply; an image forming portion configured to form an image using the power supplied from the power supply; and a power-supply controller circuit according to claim 1 configured to control the power supply.

According to the aspects, the power-supply controller circuit needs no controller IC to control the power supply and is capable of reducing the current consumption to zero while the power-supply controller circuit is in the OFF state, so that the soft-switching function of the power supply can be implemented with an extremely small-scale circuit.

DETAILED DESCRIPTION OF THE EMBODIMENTS

Figure 1:
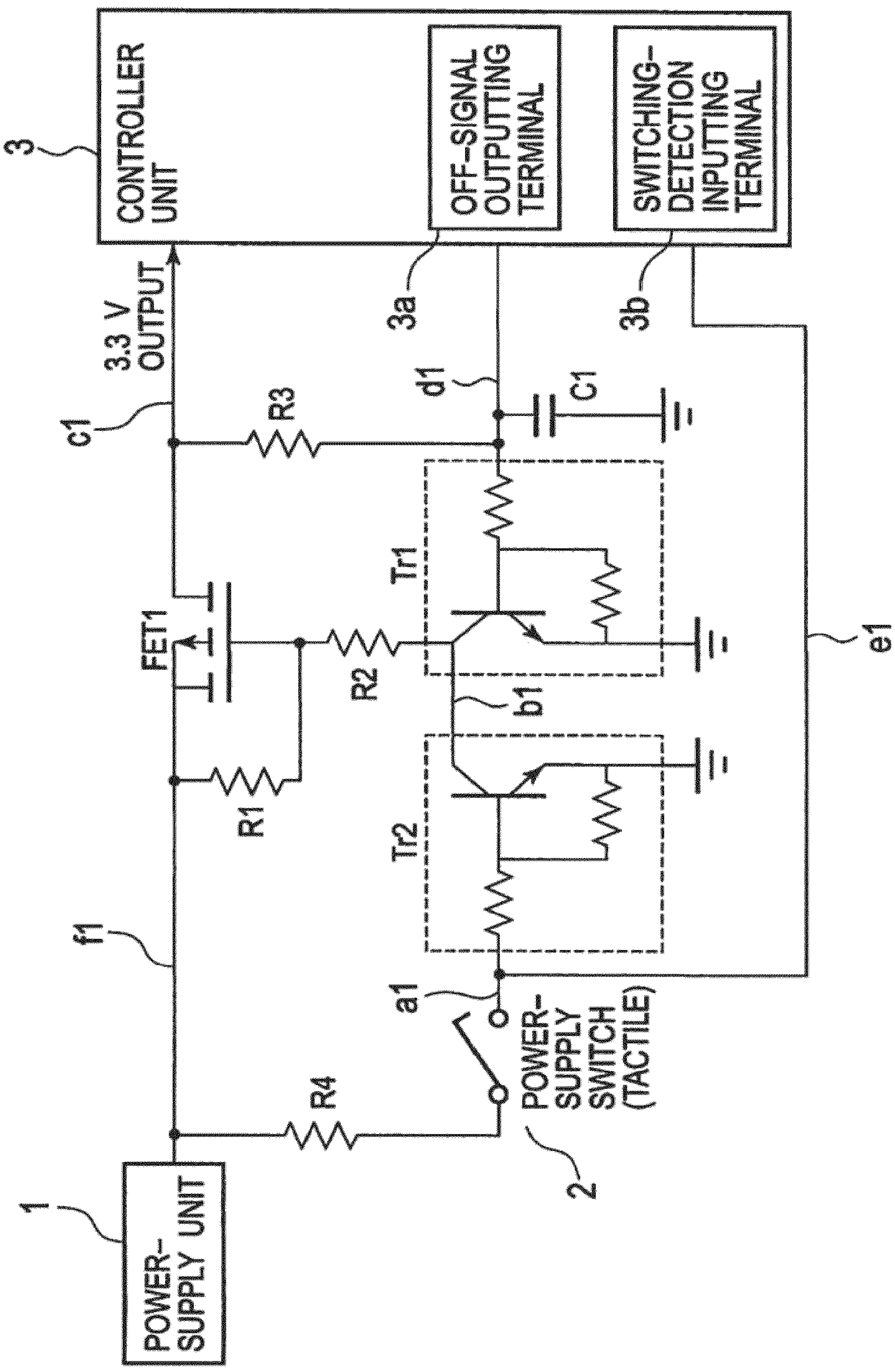
FIG. 1 is a diagram illustrating the configuration of a power-supply controller circuit in a first embodiment of the invention.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only.

(First Embodiment)

A power-supply controller circuit in a first embodiment of the invention is described by referring to FIG. 1 illustrating the configuration of the power-supply controller circuit.

The power-supply controller circuit shown in FIG. 1 includes power-supply unit 1 configured to output direct current, power-supply switch 2 serving as a power-supply switch unit, controller unit 3 serving as a controller unit of an apparatus to which power is supplied, resistors R1 to R4, capacitor C1, digital transistors Tr1 and Tr2, and switching element FET1 serving as a switching unit. Switching element FET1 is a field effect transistor (FET). A latch circuit serving as a latching unit is formed of at least digital transistors Tr1 and Tr2. The outputting of an OFF-signal from an OFF-signal outputting terminal performed by the controller unit is equivalent to the outputting of an unlatching signal by an unlatching unit.

To be more specific, the DC output of power-supply unit 1 is connected to a first end of power-supply switch 2 through resistor R4 and is connected to the drain of switching element FET1. A second end of power-supply switch 2 is connected to the base of digital transistor Tr2. The collector of digital transistor Tr2 is connected to the gate of switching element FET1 through resistor R2. The connection point of power-supply switch 2 and the base of digital transistor Tr2 are connected to switching-detection inputting terminal 3*b* (signal-input portion) of controller unit 3. The source of switching element FET1 is connected, as the power supply, to controller unit 3 and is also connected to the base of digital transistor Tr1 through resistor R3. Capacitor C1 is connected to the base of digital transistor Tr1, and OFF-signal outputting terminal 3*a* (signal-output portion) of controller unit 3 is connected also to the base of digital transistors Tr1. Like the collector of digital transistors Tr2, the collector of digital transistors Tr1 is connected to the gate of switching element FET1 through resistor R2. The emitters of digital transistors Tr1 and Tr2 are grounded.

To put it differently, the power-supply controller circuit in this embodiment includes: power-supply switch 2, which is a manually-operated power-supply switch unit; switching element FET1, which is a switching unit configured to perform output control on the output voltage to controller unit 3 in response to an ON-signal of power-supply switch 2; digital transistors Tr1 and Tr2, together forming a latch circuit, which is a latching unit configured to latch the ON-state of switching element FET1; point a1, which is a connection point of digital transistor Tr2 and power-supply switch 2 serving as a switching-state outputting portion configured to output signals indicating the ON/OFF-states of power-supply switch 2; controller unit 3, which is a controller unit configured to detect the switching-state output, and which is an unlatching unit configured to unlatch the ON-state latched by the latching unit in response to the output of an OFF-signal serving as an unlatching signal. In addition, resistor R3 and capacitor C1 together form an unlatching-signal delaying portion, i.e., a delaying unit to delay unlatching signals (OFF-signals).

In the above-described configuration, the power-supply controller circuit is as follows: first, during non-operating time, the route of the current flowing from power-supply unit 1 is cut off by switching element FET1; in addition, both digital transistors Tr1 and Tr2 on the power-supply controller circuit are in the OFF-state, and power-supply switch 2 is in the open state; accordingly, there is no route that allows the flow of the current, so that no current is consumed.

Next, if power-supply switch 2 is closed, digital transistor Tr2 is switched to the ON-state, and then switching element FET1 is switched to the ON-state. If the turning ON of switching element FET1 allows the power to be supplied to point c1 on the circuit diagram, the power supplied through resistor R3, serving as a returning circuit, turns digital transistor Tr1 to the ON-state and switching element FET1 is turned ON. Thus, power-supply switch 2 transitions to the open state. Even if digital transistor Tr2 transitions to the OFF-state, switching element FET1 is kept in the ON-state and continues to supply power to controller unit 3.

Figure 2:
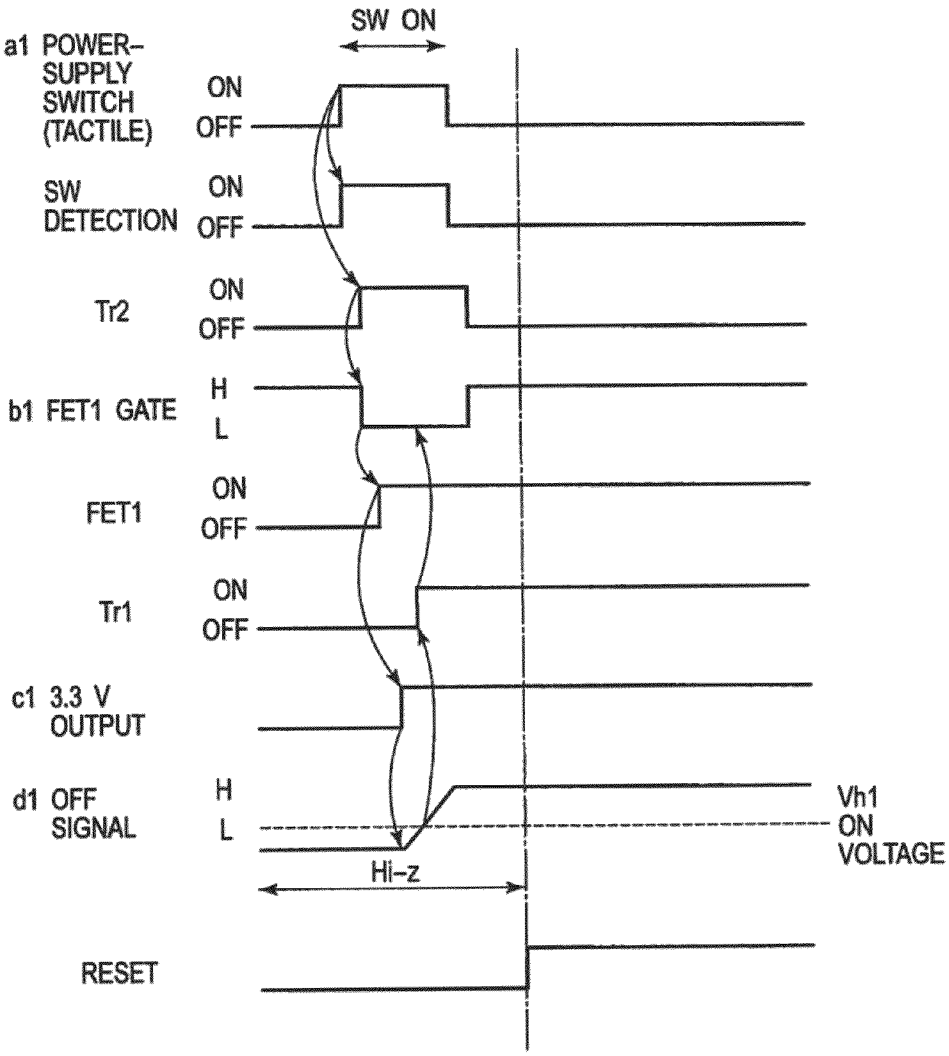
FIG. 2 is a time chart illustrating the ON-sequence of the power-supply controller circuit in the first embodiment of the invention.
Figure 3:
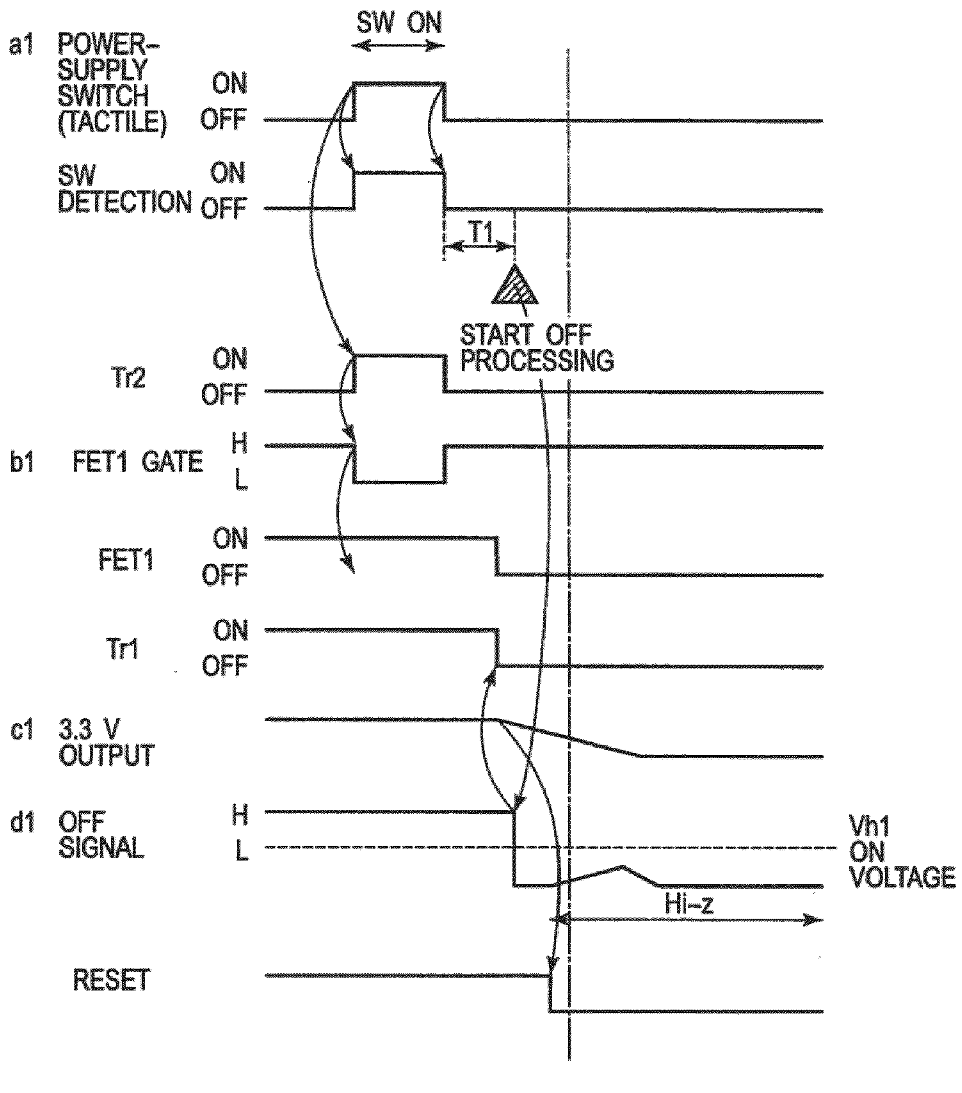
FIG. 3 is a time chart illustrating the OFF-sequence of the power-supply controller circuit in the first embodiment of the invention.

FIGS. 2 and 3 illustrate the waveforms of various elements and of points a1, b1, c1, and d1 shown in the circuit diagram of FIG. 1. FIG. 2 shows the waveforms for the ON-sequence, whereas FIG. 3 shows the waveforms for the OFF-sequence. Operations of this embodiment are described by referring to FIGS. 2 and 3.

First, the ON-sequence is described by referring to FIG. 2.

If power-supply switch 2 is pressed down, point a1 transitions to the high level and digital transistor Tr2 transitions to the ON-state. Simultaneously, the voltage of the collector output (point b1) of digital transistors Tr2 transitions to the low level, and switching element FET1 transitions to the ON-state. A DC voltage equivalent to the DC-output voltage of power-supply unit 1 (point a1) is output to point c1 subjected to the switching control.

The output voltage of point c1 subjected to the switching control is applied to point d1 through resistor R3, so that point d1 transitions to the high level. Since capacitor C1 is provided, the voltage of point d1 rises slowly with a time constant determined by the resistance value of resistor R3 and the capacity of capacitor C1. Once the voltage of point d1 exceeds the ON-voltage Vh1 of digital transistor Tr1, digital transistors Tr1 transitions to the ON-state, the voltage of point b1 transitions to the low level, and switching element FET1 is turned ON. Thus, even if the pressing of power-supply switch 2 is finished and digital transistor Tr2 is turned OFF, the ON-state of switching element FET1 continues.

Next, the OFF-sequence is described by referring to FIG. 3.

If power-supply switch 2 is pressed to turn off the power supply of the apparatus, the signal of point a1 is input through the switching-detection inputting terminal of controller unit 3. As in the case of the ON-sequence, point a1 transitions to the high level, and digital transistor Tr2 transitions to the ON-state. Simultaneously, the voltage of the collector output (point b1) of digital transistor Tr2 transitions to the low level, but because of the ON-state, digital transistor Tr1 is in the ON-state as described above and point b1 is already at the low level. Hence, the ON-state of switching element FET1 continues to be unchanged.

Controller unit 3 detects the changing of the state of power-supply switch 2 from the pressed-down, closed state to the OFF, open state. A delay of time T1 is secured from the detection timing, and then controller unit 3 outputs an OFF-signal (point d1) at the low level through the OFF-signal outputting terminal of controller unit 3. This is done in view of the fact that power-supply switch 2 is a mechanical switch, which may erroneously detect an ON-state due to chattering after power-supply switch 2 is turned OFF, and a delay of several milliseconds to several tens of milliseconds is preferably provided to preclude the influence of the chattering.

With the outputting of an OFF-signal (point d1) at the low level from controller unit 3, the base of digital transistor Tr1 transitions to the low level. Hence, digital transistor Tr1 is turned OFF, and the voltage of point b1 rises to turn switching element FET1 to the OFF-state. Once switching element FET1 is in the OFF-state, the output voltage of point c1 subjected to the switching control is cut off and drops down. The supply of power to controller unit 3 is cut off, and the above-described latch in the ON-state transitions to the unlatched state.

When the supply of power to controller unit 3 is cut off and drops down, an unillustrated resetting circuit brings controller unit 3 into the reset state. In general, when controller unit 3 is in the reset state, the output port (i.e., OFF-signal outputting terminal) of controller unit 3 is in the high-impedance (Hi-z) state. For this reason, as an event of resetting occurs that makes the output voltage of point c1 start dropping, the OFF-signal outputting terminal (point d1) of controller unit 3 transitions to the Hi-z state, and then the voltage starts to rise again. This rising of the voltage, however, occurs slowly with a time constant determined by resistor R3 and capacitor C1. The output voltage of point c1 drops down completely before reaching ON-voltage Vh1 of digital transistor Tr1, so that digital transistor Tr1 is not turned ON again.

Accordingly, the power-supply controller circuit has the following characteristics. With switching element FET1 serving as a switching unit being in the OFF-state, the turning ON of power-supply switch 2 serving as a power-supply switch unit causes switching element FET1 to be in the ON-state, and the ON-state is latched by a latch circuit serving as a latching unit including digital transistors Tr1 and Tr2 and the like. In contrast, when an ON-signal of power-supply switch 2 is detected with switching element FET1 serving as a switching unit being in the ON-state, the ON-signal of power-supply switch 2 is changed to OFF, and then controller unit 3 outputs an OFF-signal as an unlatching signal to activate the unlatching unit, so that switching element FET1 turns OFF the outputting of the output voltage to controller unit 3.

As has been described thus far, in the first embodiment of the invention, no controller IC is needed in the power-supply control, and the power-supply controller circuit that is in the OFF-state achieves a zero current consumption of the current flowing through the power-supply controller circuit. In addition, with the power-supply controller circuit, a soft-switching function of the power supply is implemented with an extremely small-scale circuit.

(Second Embodiment)

Figure 4:
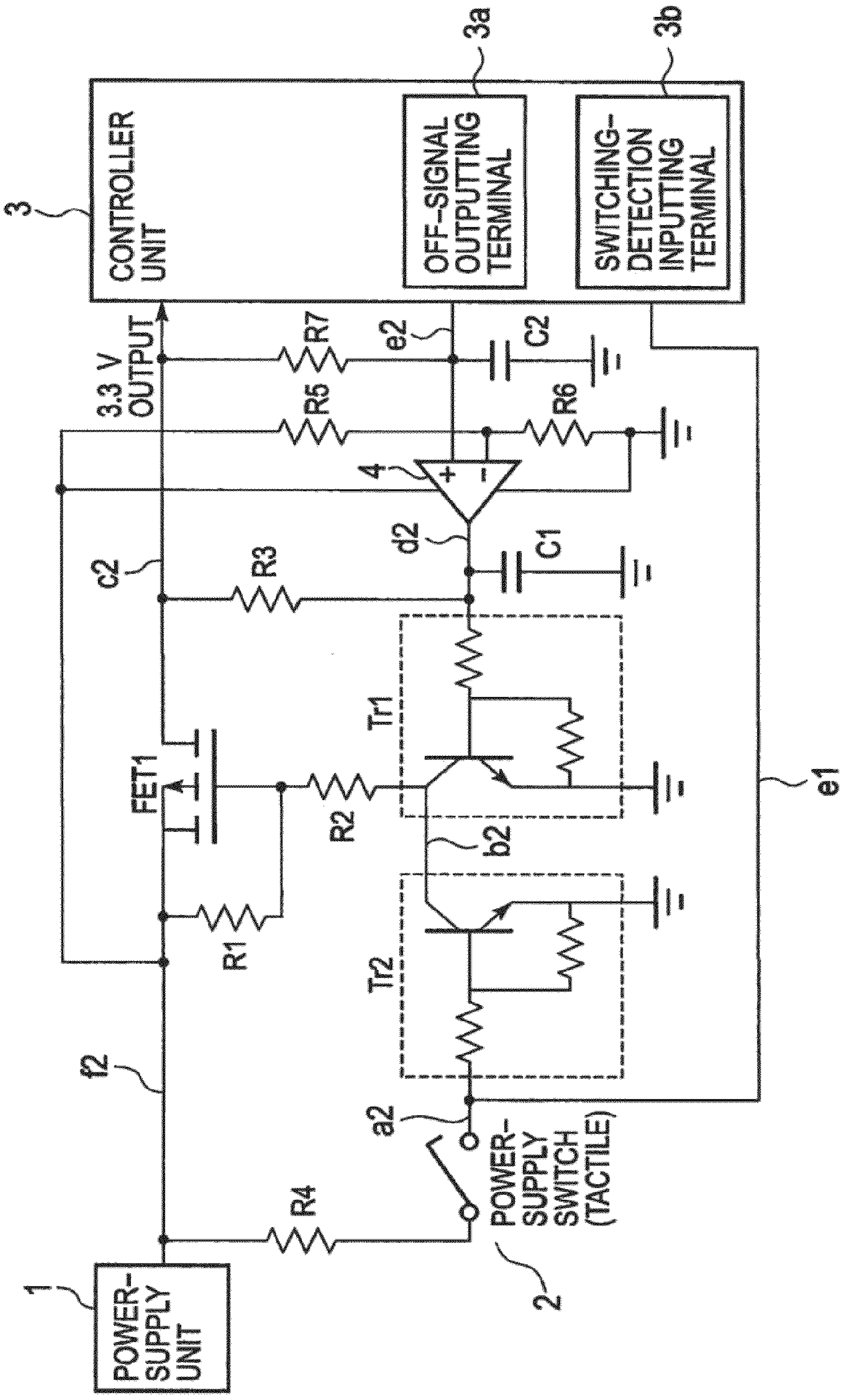
FIG. 4 is a diagram illustrating the configuration of a power-supply controller circuit in a second embodiment of the invention.

A power-supply controller circuit in a second embodiment of the invention is described by referring to FIG. 4 illustrating the configuration of the power-supply controller circuit.

The power-supply controller circuit shown in FIG. 4 includes power-supply unit 1 configured to output direct current, power-supply switch 2 serving as a power-supply switch unit, controller unit 3 serving as a controller unit of an apparatus to which power is supplied, resistors R1 to R7, digital transistors Tr1 and Tr2, comparator 4, and switching element FET1. Switching element FET1 is a field effect transistor. A latch circuit serving as a latching unit is formed of at least digital transistors Tr1 and Tr2. The outputting of an OFF-signal from an OFF-signal outputting terminal performed by the controller unit is equivalent to the outputting of an unlatching signal by an unlatching unit.

To be more specific, the DC output of power-supply unit 1 is connected to a first end of power-supply switch 2 through resistor R4 and is connected to the drain of switching element FET1. A second end of power-supply switch 2 is connected to the base of digital transistor Tr2. The collector output of digital transistor Tr2 (point b2) is connected to the gate of switching element FET1 through resistor R2. The connection point of power-supply switch 2 and the base of digital transistor Tr2 are connected to switching-detection inputting terminal 3*b* of controller unit 3. The source output of switching element FET1 (point c2) is connected, as the power supply, to controller unit 3 and is also connected to the base of digital transistor Tr1 through resistor R3. The output of comparator 4 is connected to the base of digital transistor Tr1. The reference voltage formed by dividing the voltage at point f2 with resistors R5 and R6 is input to the minus terminal of comparator 4. The plus terminal of comparator 4 is connected to the OFF-signal outputting terminal (point e2) of controller unit 3, pull-up resistor R7, and capacitor C2. In the same manner as the collector of digital transistor Tr2, the collector of digital transistors Tr1 is connected to the gate of switching element FET1 through resistor R2.

To put it differently, the power-supply controller circuit in this embodiment includes: power-supply switch 2, which is a manually-operated power-supply switch unit; switching element FET1, which is a switching unit configured to perform output control on the output voltage to controller unit 3 in response to an ON-signal of power-supply switch 2; digital transistors Tr1 and Tr2, together forming a latch circuit, which is a latching unit configured to latch the ON-state of switching element FET1; point a2, which is a connection point of digital transistor Tr2 and power-supply switch 2 serving as a switching-state outputting portion configured to output signals indicating the ON/OFF-states of power-supply switch 2; controller unit 3, which is a controller unit configured to detect the switching-state output, and which is an unlatching unit configured to unlatch the ON-state latched by the latching unit in response to the output of an OFF-signal serving as an unlatching signal. In addition, resistor R7, capacitor C2 and comparator 4 together form an unlatching-signal delaying portion, i.e., a delaying unit to delay unlatching signals (OFF-signals).

In the above-described configuration, the power-supply controller circuit is as follows: first, during non-operating time, the route of the current flowing from power-supply unit 1 is cut off by switching element FET1; in addition, both digital transistors Tr1 and Tr2 on the power-supply controller circuit are in the OFF-state, and power-supply switch 2 is in the open state; accordingly, the only routes that allow the current flow are the current flow from the power supply to comparator 4 and the current flow through resistors R5 and R6 to generate the reference voltage, so that the current consumption is extremely small.

Figure 5:
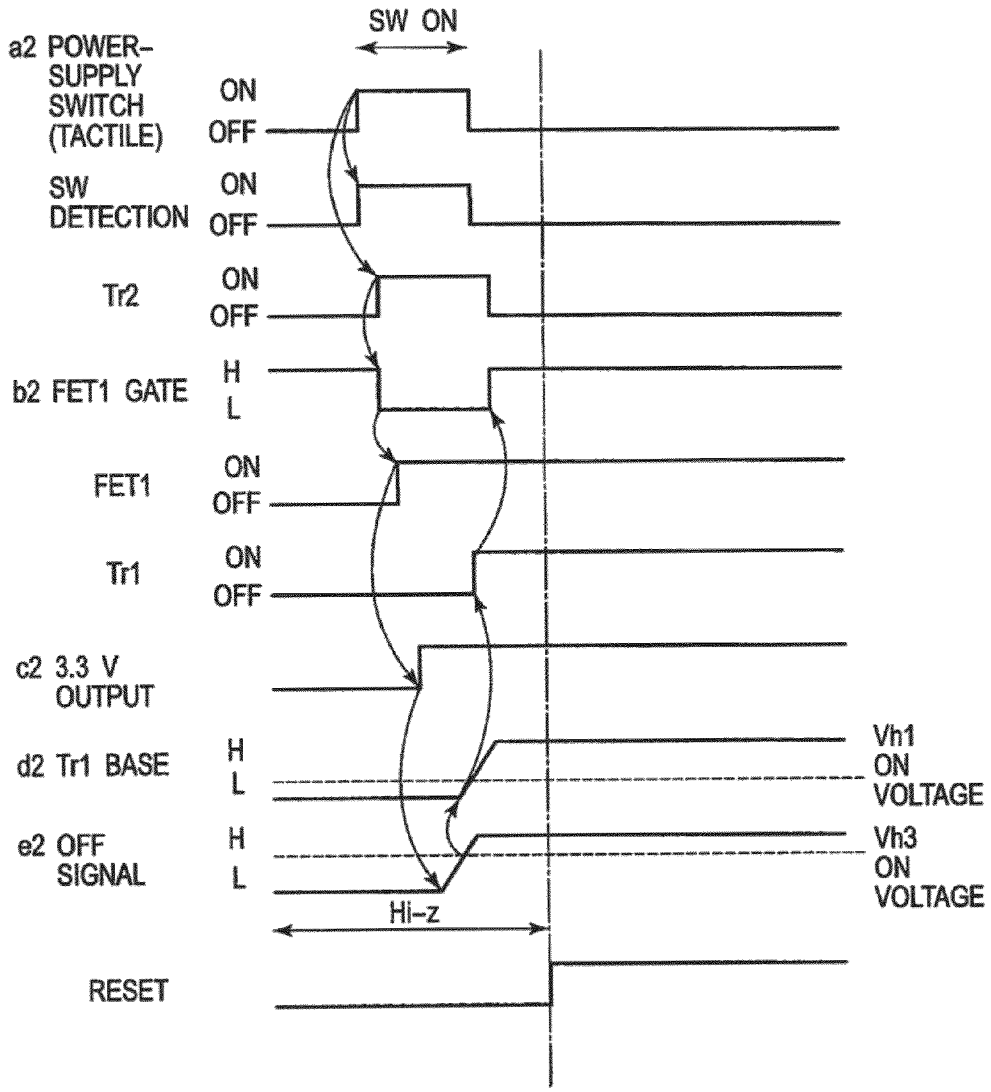
FIG. 5 is a time chart illustrating the ON-sequence of the power-supply controller circuit in the second embodiment of the invention.
Figure 6:
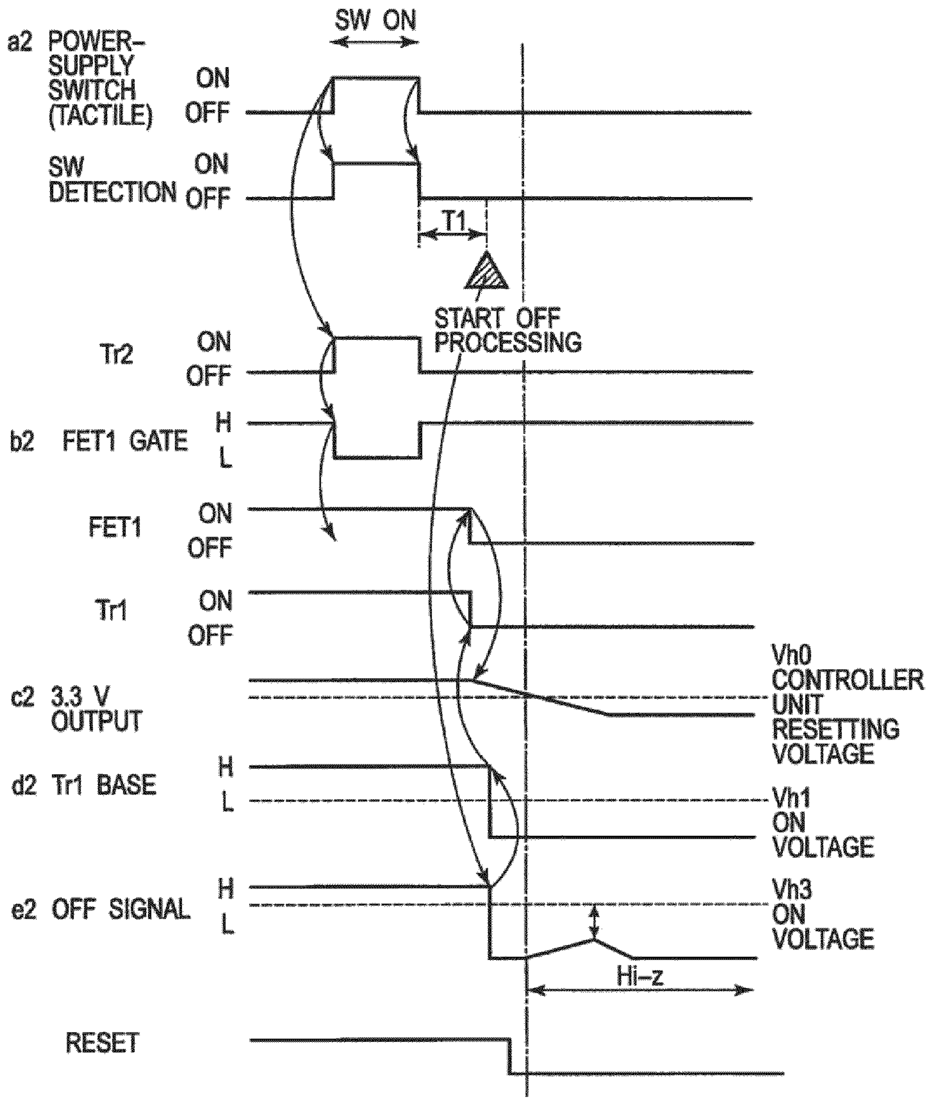
FIG. 6 is a time chart illustrating the OFF-sequence of the power-supply controller circuit in the second embodiment of the invention.

The operations of the second embodiment are described by referring to FIGS. 5 and 6. FIGS. 5 and 6 illustrate the waveforms of various elements and of points a2, b2, c2, d2, e2, and f2 shown in the circuit diagram of FIG. 4. FIG. 5 shows the waveforms for the ON-sequence, whereas FIG. 6 shows the waveforms for the OFF-sequence. Operations of this embodiment are described by referring to FIGS. 5 and 6.

First, the ON-sequence is described by referring to FIG. 5.

If power-supply switch 2 is pressed down, point a2 transitions to the high level and digital transistor Tr2 transitions to the ON-state. Simultaneously, the voltage of the collector output (point b2) of digital transistors Tr2 transitions to the low level, and switching element FET1 transitions to the ON-state. A DC voltage equivalent to the output voltage of power-supply unit 1 (point a2) is output to point c2 subjected to the switching control by switching element FET1.

The output signal from controller unit 3 is in the Hi-z state until power is supplied to controller unit 3. When the resetting is canceled after power is supplied to controller unit 3, the plus terminal of comparator 4 outputs a high-level output by default. Accordingly, the voltage rises up with a time constant determined by both resistor R4 and capacitor C2, and after a certain period of time, the voltage thus rising exceeds the reference voltage (ON-voltage Vh3) input into the minus terminal of comparator 4. Once the voltage exceeds ON-voltage Vh3, the output of comparator 4 transitions to the Hi-z state, the voltage thus rising of point d2 rises with a time constant determined by resistor R3 and capacitor C1. If the voltage thus rising exceeds ON-voltage Vh1 of digital transistor Tr1, digital transistor Tr1 is turned ON and the voltage of point b2 transitions to the low level, which keeps the ON-state of switching element FET1. Thus, even if the pressing of power-supply switch 2 is finished and digital transistor Tr2 is turned OFF, the ON-state of switching element FET1 continues.

Next, the OFF-sequence is described by referring to FIG. 6.

If power-supply switch 2 is pressed to turn off the power supply 1 of the apparatus, the signal of point a2 is input through the switching-detection inputting terminal of controller unit 3. As in the case of the ON-sequence, point a2 transitions to the high level, and digital transistor Tr2 transitions to the ON-state. Simultaneously, the voltage of the collector output (point b2) of digital transistor Tr2 transitions to the low level, but because digital transistor Tr1 is in the ON-state as described above and point b2 is already at the low level, the ON-state of switching element FET1 continues to be unchanged. Subsequently, controller unit 3 detects the changing of the state of power-supply switch 2 from the pressed-down state to the OFF-state. Then, after a delay of a certain length of time T1 is provided from the detection timing, an OFF-signal (point e2) from controller unit 3 is output at the low level.

Hence, a low-level voltage that is lower than the reference voltage Vh3 of the minus terminal is input to the plus terminal of comparator 4, and comparator 4 outputs a low-level voltage to the base (point d2) of digital transistor Tr1. Thus, digital transistor Tr1 transitions to the OFF-state. Once digital transistor Tr1 transitions to the OFF-state, the voltage of point b2 changes from the low level to the high level. Then, switching element FET1 is turned OFF and the output voltage of point c2 subjected to the switching control is cut off and drops down. Hence, the supply of power to controller unit 3 is cut off. In addition, the above-described latch in the ON-state becomes in the unlatched state.

When the supply of power to controller unit 3 is cut off and the supply voltage drops down, an unillustrated resetting circuit brings controller unit 3 into the reset state. Here, when controller unit 3 is in the reset state, the OFF-signal at the OFF-signal outputting terminal (point e2) of controller unit 3 is in the Hi-z state. Then the voltage of point d2 starts to rise again. This rising of the voltage, however, occurs slowly with a time constant determined by resistor R4 and capacitor C2. Accordingly, the output voltage of the supply voltage of point c2 drops down completely before reaching reference voltage Vh3 of the minus terminal of comparator 4, so that comparator 4 does not output Hi-z again.

As has been described thus far, in the second embodiment of the invention, although there is a slight increase in the current consumption to operate comparator 4 and voltage-dividing resistors R5 and R6, it is possible to reliably turn off an output because of the high setting freedom of the time constant for the delay of the OFF-signal even if the dropping of the output subjected to the switching control is slow at the OFF-time.

(Third Embodiment)

Figure 7:
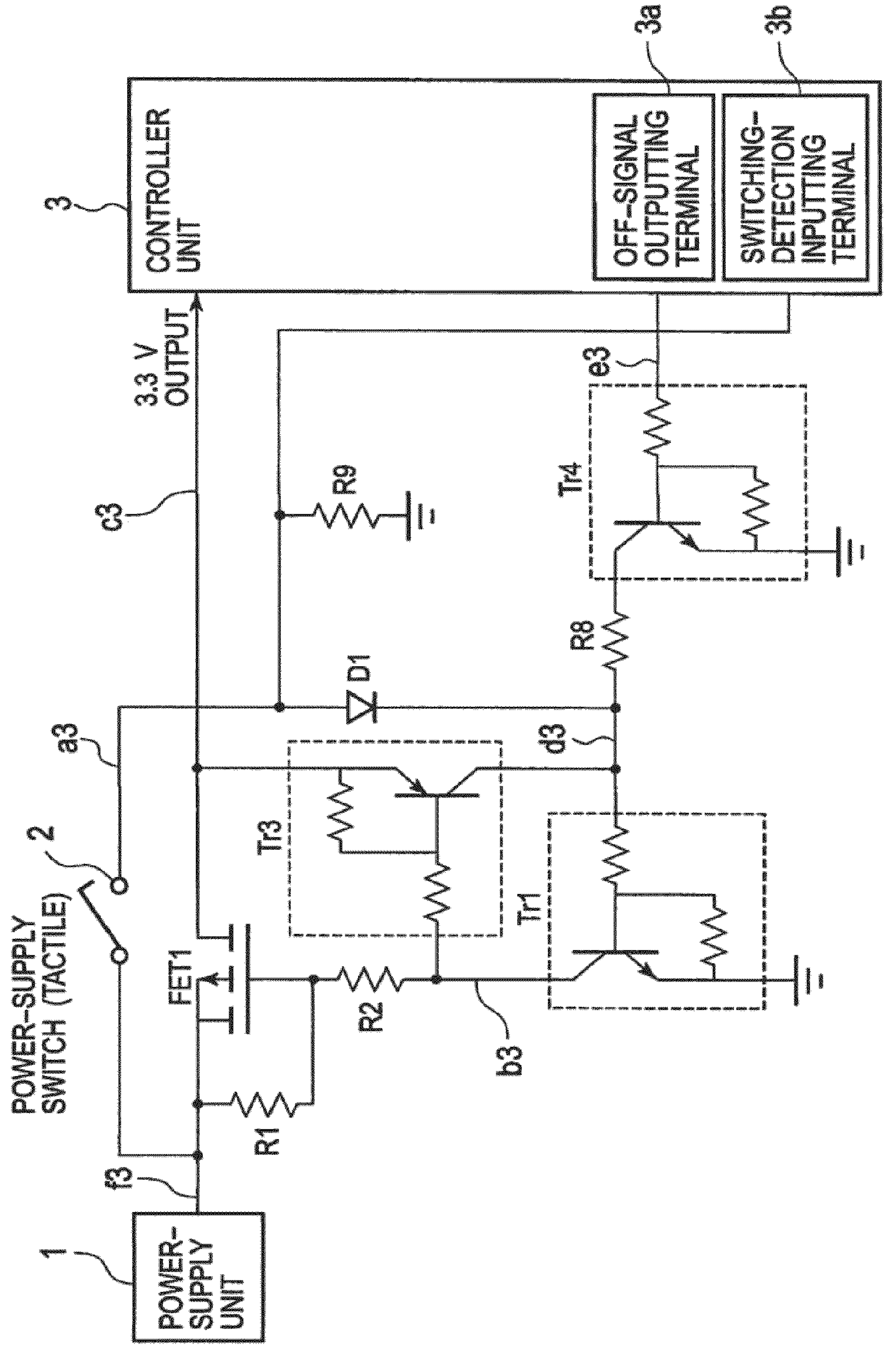
FIG. 7 is a diagram illustrating the configuration of a power-supply controller circuit in a third embodiment of the invention.

A power-supply controller circuit in a third embodiment of the invention is described by referring to FIG. 7 illustrating the configuration of the power-supply controller circuit.

The power-supply controller circuit shown in FIG. 7 includes power-supply unit 1 configured to output direct current, power-supply switch 2 serving as a power-supply switch unit, controller unit 3 serving as a controller unit of an apparatus to which power is supplied, resistors R1, R2, R8 and R4, digital transistors Tr1, Tr3 and Tr4, diode D1, and switching element FET1. Switching element FET1 is a field effect transistor. A latch circuit serving as a latching unit is formed of at least digital transistors Tr1, Tr3 and Tr4. The outputting of an OFF-signal from an OFF-signal outputting terminal performed by the controller unit is equivalent to the outputting of an unlatching signal by an unlatching unit. Digital transistors Tr1 and Tr4 are NPN-type transistors, whereas digital transistor Tr3 is a PNP-type transistor.

To be more specific, the DC output (point f3) of power-supply unit 1 is connected to a first end of power-supply switch 2 and is connected to the drain of switching element FET1. A second end of power-supply switch 2 is connected to the base of digital transistor Tr1 through diode D1. The connection point of the second end of power-supply switch 2 and the anode of diode D1 is connected to pull-down resistor R9, and is connected to the switching-detection inputting terminal of controller unit 3 to detect the ON/OFF of power-supply switch 2. The collector output of digital transistor Tr1 is connected to the gate of switching element FET1 through resistor R2, and is connected to the base of digital transistor Tr3. The collector of digital transistor Tr3 is connected to the base of digital transistor Tr1. The source output (point c3) of switching element FET1 is connected, as the power supply, to the controller unit 3, and is connected to the emitter of digital transistor Tr3. To the base of digital transistor Tr1, the collector of digital transistor Tr4 is connected through resistor R8. The emitter of digital transistor Tr4 is connected to 0 V, whereas the OFF-signal outputting terminal of controller unit 3 is connected to the base of digital transistor Tr4.

To put it differently, the power-supply controller circuit in this embodiment includes: power-supply switch 2, which is a manually-operated power-supply switch unit; switching element FET1, which is a switching unit configured to perform output control on the output voltage to controller unit 3 in response to an ON-signal of power-supply switch 2; digital transistors Tr1, Tr3 and Tr4, together forming a latch circuit, which is a latching unit configured to latch the ON-state of switching element FET1; point a3, which is a connection point of diode D1 and power-supply switch 2 serving as a switching-state outputting portion configured to output signals indicating the ON/OFF-states of power-supply switch 2; controller unit 3, which is a controller unit configured to detect the switching-state output, and which is an unlatching unit configured to unlatch the ON-state latched by the latching unit in response to the output of an OFF-signal serving as an unlatching signal.

In the above-described configuration, the power-supply controller circuit is as follows: first, during non-operating time, the route of the current flowing from power-supply unit 1 is cut off by switching element FET1; in addition, both digital transistors Tr1 and Tr3 on the power-supply controller circuit are in the OFF-state, and power-supply switch 2 is in the open state; accordingly, there is no route that allows the flow of the current, so that no current is consumed.

Figure 8:
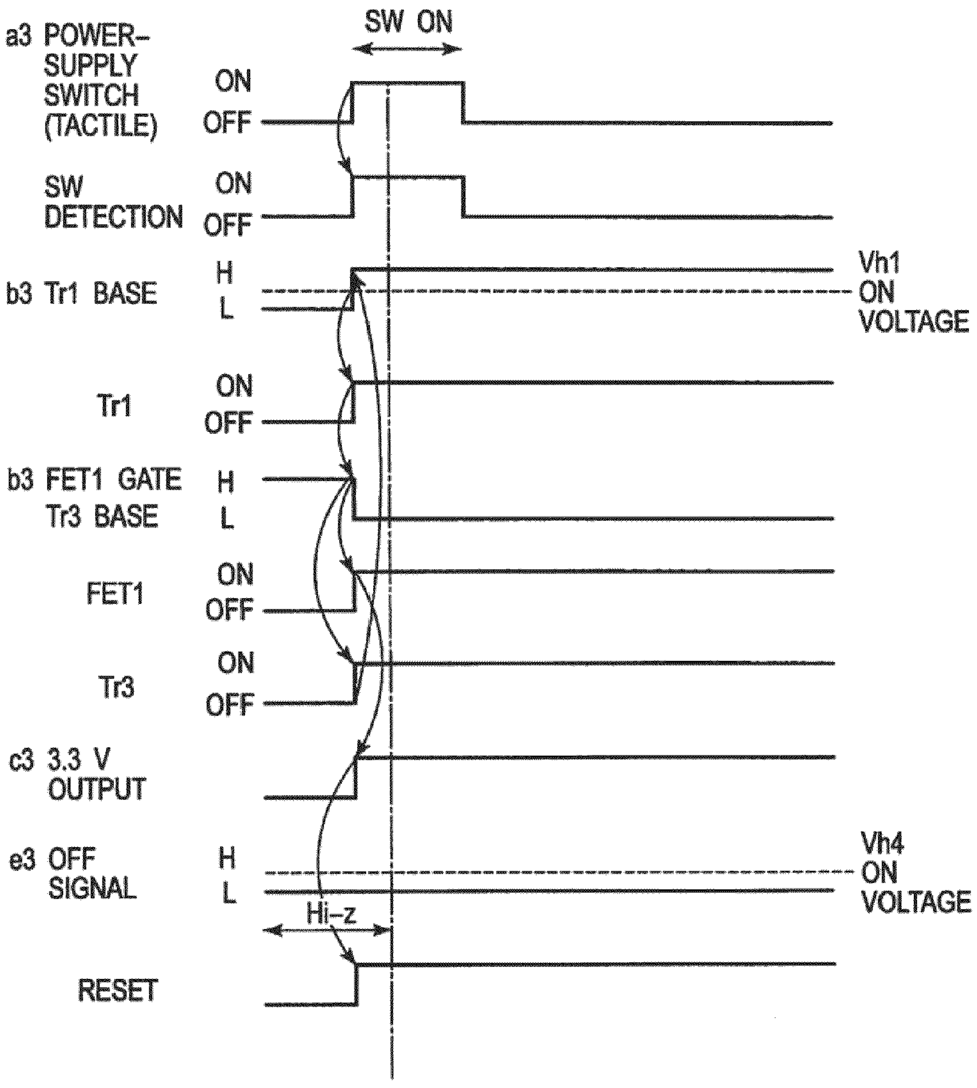
FIG. 8 is a time chart illustrating the ON-sequence of the power-supply controller circuit in the third embodiment of the invention.
Figure 9:
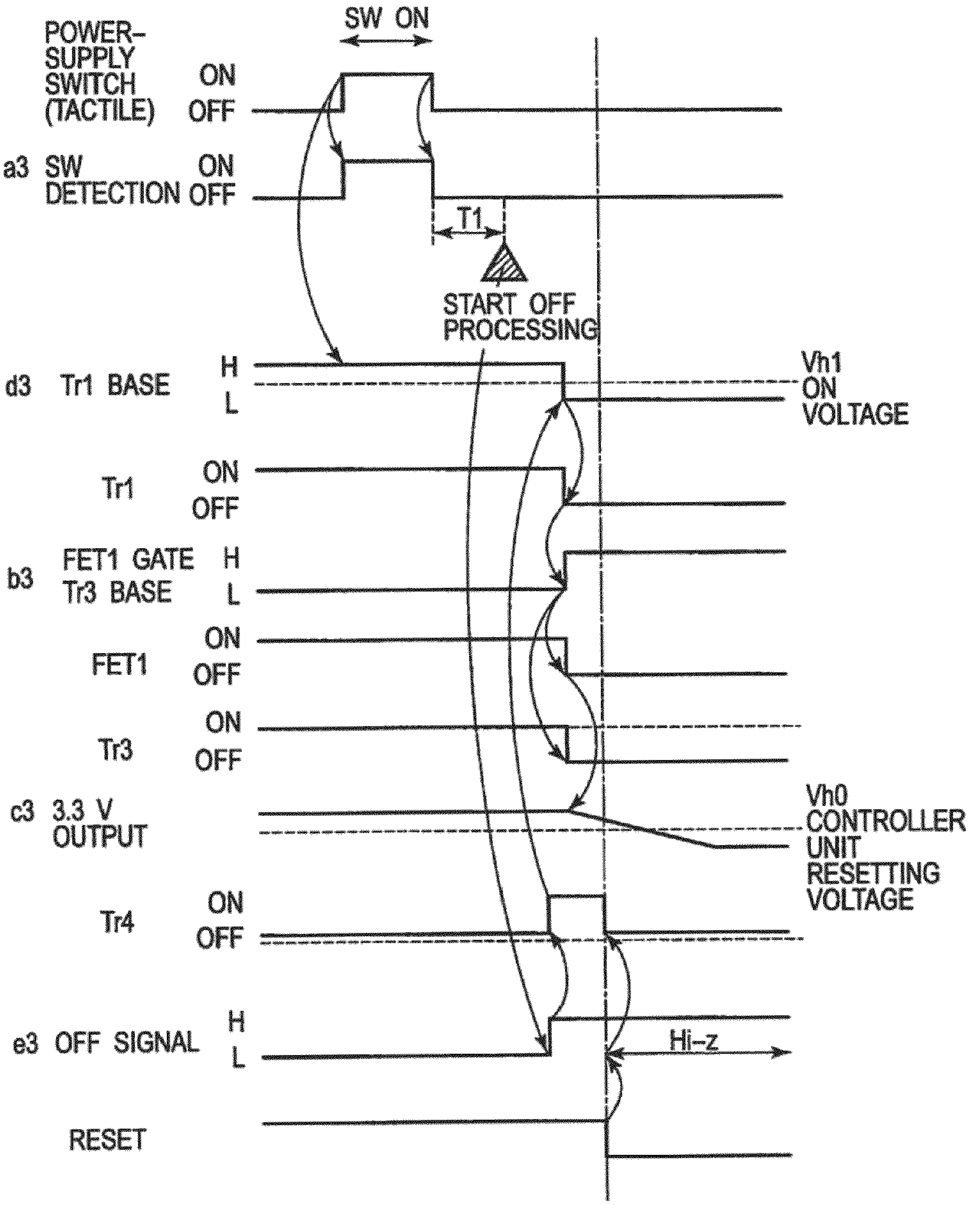
FIG. 9 is a time chart illustrating the OFF-sequence of the power-supply controller circuit in the third embodiment of the invention.

The operations of the third embodiment are described by referring to FIGS. 8 and 9. FIGS. 8 and 9 illustrate the waveforms of various elements and of points a3, b3, c3, and d3 shown in the circuit diagram of FIG. 7. FIG. 8 shows the waveforms for the ON-sequence, whereas FIG. 9 shows the waveforms for the OFF-sequence. Operations of this embodiment are described by referring to FIGS. 5 and 6.

First, the ON-sequence is described by referring to FIG. 8.

If power-supply switch 2 is pressed down, point a3 transitions to the high level, and point d3 also transitions to the high level by way of diode D1. With point d3 being at the high level, digital transistor Tr1 transitions to the ON-state. With digital transistor Tr1 being in the ON-state, the voltage of the base of digital transistor Tr3, and the voltage of point b3 of the gate of switching element FET1 transition to the low level. Switching element FET1 transitions to the ON-state, and a DC voltage equivalent to the DC-output voltage (point a3) of power-supply unit 1 is output to point c3 subjected to the switching control by switching element FET1. In addition, digital transistor Tr3 is also turned ON, and a voltage of point c3 output to the base of digital transistor Tr3 is applied to the base of digital transistor Tr1. Hence, even if power-supply switch 2 is no longer pressed down and is left in the open state and no voltage is applied to point d3, which is the base of digital transistor Tr1, through power-supply switch 2, a voltage continues to be applied to point d3 by digital transistor Tr3, and thereby the ON-state of digital transistor Tr1 is latched.

Next, the OFF-sequence is described by referring to FIG. 9.

If power-supply switch 2 is pressed to turn off the power supply of the apparatus, the signal at point a3 transitions to the high level as in the case of the ON-sequence. If point a3 transitions to the high level, a voltage is applied to point d3 through diode D1. Digital transistors Tr1, however, is already in the ON-state, so that the states of digital transistors Tr1, Tr3 and switching element FET1 continue to be unchanged.

If the state of power-supply switch 2 changes from the pressed-down state to the OFF-state, the voltage of point a3 is changed to the low level because of the following reasons: no voltage is supplied from power-supply switch 2 to point a3; the voltage of point a3 is pulled down to 0 V by resistor R9; and the voltage of point a3 is cut off from the voltage of point d3 by diode D1.

Point a3 is connected to the switching-detection terminal of controller unit 3. Controller unit 3 detects the fact that power-supply switch 2 becomes open. After a certain delay of time T1 is provided from the detection timing, an OFF-signal is output at the high level from the OFF-signal outputting terminal of controller unit 3 to the base of digital transistor Tr4.

Hence, digital transistor Tr4 transitions to the ON-state, and the voltage of point d3 changes to the low level. If point d3 transitions to the low level, digital transistor Tr1 transitions to the OFF-state. If digital transistor Tr1 transitions to the OFF-state, the voltage of point d3 changes from the low level to the high level, so that the digital transistor Tr3 transitions to the OFF-state. Accordingly, the supply of voltage from digital transistor Tr3 to point d3, which is the base of digital transistor Tr1, is cut off, and the latched state is unlatched. In addition, with point b3 at the low level, switching element FET1 also transitions to the OFF-state. Hence, the output voltage of point c3 subjected to the switching control is cut off, so that the supply of power to controller unit 3 is cut off.

When the supply of power to controller unit 3 is cut off and the supplied voltage drops down, an unillustrated resetting circuit brings controller unit 3 into the reset state. The OFF-signal from the OFF-signal outputting terminal of controller unit 3 to digital transistor Tr4 transitions to the Hi-z state, and thus digital transistors Tr4 transitions to the OFF-state. As has been described earlier, power-supply switch 2 of the voltage-supplying route to point d3 is in the open state and digital transistor Tr3 is also in the OFF-state. Accordingly, no state change occurs.

As has been described thus far, in the third embodiment of the invention, the latch circuit is formed of a PNP-type transistor, NPN-type transistors, and resistors, so that no controller IC is necessary. In addition, while the power-supply controller circuit is in the OFF-state, no current flows through any circuits. Accordingly, it is possible to achieve zero current consumption of the entirety including the power-supply controller circuit. In addition, even through the output under the switching control is slowly dropped down upon being turned OFF, the influence on the unlatching of the latch circuit is precluded. Thus, the OFF-control can be performed without having a delay unit provided to delay the unlatching signal. Accordingly, a soft-switching function of the power supply can be implemented by an extremely small-scale circuit.

(Fourth Embodiment)

Figure 10:
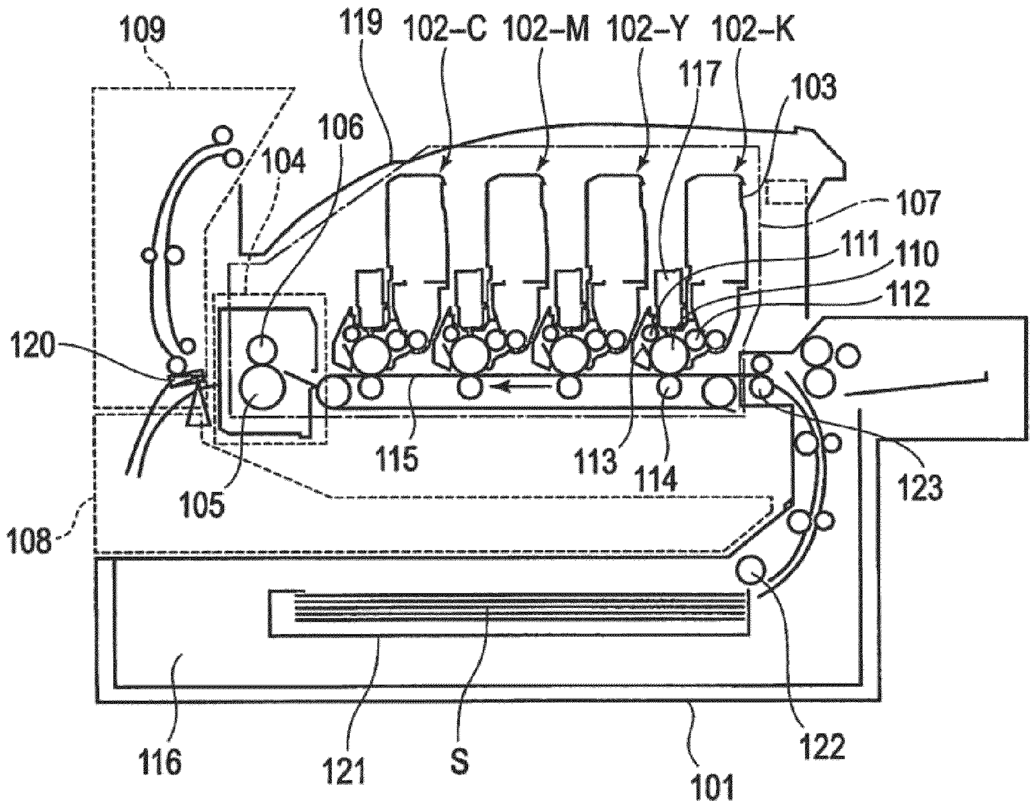
FIG. 10 is a diagram illustrating the configuration of an image forming apparatus in a fourth embodiment of the invention.

FIG. 10 is a sectional view illustrating the configuration of an image forming apparatus in a fourth embodiment of the invention to which the power-supply controller circuit of any of the first to third embodiments of the invention is applied. The image forming apparatus of the case shown in FIG. 10 is a tandem-type printer apparatus. The general structure of the image forming apparatus in the fourth embodiment of the invention is described below by referring to FIG. 10.

As FIG. 10 shows, image forming apparatus 101 includes image forming portion 107, sheet feeder portion 116, and fixing portion 104, and is capable of forming images on paper sheet S.

The structure of image forming apparatus 101 is described by the sequence of printing operations. The conveying of paper sheet S starts from sheet feeder portion 116. Sheet feeder portion 116 includes sheet-feeder cassette 121, sheet-feeder roller 122, register roller 123, and the like. Paper sheet S conveyed from sheet-feeder cassette 121 by the rotation of sheet-feeder roller 122 is sent to register roller 123. Then, paper sheet S is conveyed onto transferring conveyor belt 115, and reaches image forming portion 107 for various colors.

Image forming portion 107 includes four image forming units 103 for four colors. As FIG. 10 shows, four image forming units 103 are arranged side by side with each other and in the order of black (K), yellow (Y), magenta (M), and cyan (C) from the right side to the left side of FIG. 10. Image forming units 103 are provided with toner cartridges 102 of the respective colors. Image forming units 103 are separable from respective toner cartridges 102. Toner cartridges 102 (K, Y, M, and C) have the same configuration except for the (colors of) developers held in the cartridges. In addition, printing heads 117 are in contact with respective image forming units 103 when cover 119 is closed.

Each image forming unit 103 includes photosensitive drum 110, charging unit 111, developing roller 112, and cleaner 113. Photosensitive drum 110 has a circumferential surface made of a photo-conductive material. Charging unit 111, developing roller 112, cleaner 113 are sequentially arranged in the vicinity of the circumferential surface of photosensitive drum 110. Transferring unit 114 comes into contact with photosensitive drum 110 with transferring conveyor belt 115 therebetween. Photosensitive drum 110 rotates in a direction in which paper sheet S is conveyed. The charging unit 111 first provides electric charges to uniformly charge the circumferential surface of photosensitive drum 110. Then, by optical writing based on the printing information from printing head 117, an electrostatic latent image is formed on the circumferential surface of photosensitive drum 110, and then a toner image is formed by a developing treatment performed by developing roller 112. The toner image formed on the circumferential surface of photosensitive drum 110 is an image formed from the toners of colors held in toner cartridges 102. The toner image formed on the circumferential surface of photosensitive drum 110 reaches the position of transferring unit 114 as photosensitive drum 110 rotates in the direction indicated by the arrow. At that position, the toner image is transferred onto paper sheet S that moves right below photosensitive drum 110 in the direction indicated by the arrow. Then, the toner image is transferred onto the top surface of paper sheet S. The printing is thus performed.

Paper sheet S with the toner images transferred thereto at the respective transferring units moves on transferring conveyor belt 115 in the direction indicated by the arrow as the transferring conveyor belt 115 moves. Paper sheet S with toner images is then subjected to a thermal fixing treatment at fixing unit 104.

The toner images of plural colors having been transferred onto paper sheet S while paper sheet S is held and conveyed between heating roller 106 and pressurizing roller 105 of fixation unit 104 are melted and are thermally fixed onto paper sheet S. Paper sheet S with the toner images fixed by fixation unit 104 is conveyed to discharging unit 109, and is then discharged out. Alternatively, paper sheet S is conveyed to duplex-printing unit 108 by way of switching board 120 so as to perform duplex printing, and thereby another image is formed by the image forming portion on the opposite-side surface of paper sheet.

In the above-described first to third embodiments of the invention, one switching unit is provided for one power supply. The invention is not limited to this configuration. For instance, the invention is applicable to a case where switching units correspond respectively to plural outputs of power supply. In addition, as a delaying unit to delay the unlatching signals (OFF-signals), an unlatching-signal delaying portion using the CR-time constant and an unlatching-signal delaying portion using a comparator are described above as embodiments of the invention. It is, however, possible to implement the embodiments by use of a resetting circuit, delaying element, or the like. In addition, the latch circuits of the above-described cases are formed of digital transistors. However, it is of course possible to implement the embodiments as well by use of ordinary transistors or FETs in place of the digital transistors.

The power-supply controller circuits in the various embodiments described above are commonly applicable to various electronic apparatus. In particular, the power-supply controller circuits are also applicable to image forming apparatus such as MFP apparatuses.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A power-supply controller circuit comprising:

a power-supply switch unit configured to output an ON-signal when operated manually;

a switching unit configured to switch ON and OFF an output voltage to a controller unit in response to the ON-signal of the power-supply switch unit;

a latching unit configured to latch the ON-state of the switching unit, when the power-supply switch unit outputs an ON-signal under a condition where the switching unit is in the OFF-state; and a controller unit configured to control an unlatching signal to unlatch the ON-state latched by the latching unit when the latching unit is in the ON-state and detects the ON-signal sent from the power-supply switch unit, wherein the latching unit includes:

a first latch configured to continue to latch the ON-state, while the ON-state is being latched, irrespective of whether or not there is an ON-signal sent from the power-supply switch unit; and a second latch configured to unlatch the ON-state latched by the first latch.

2. The power-supply controller circuit according to claim 1 further comprising a signal delaying unit configured to receive the unlatching signal output from the controller unit, and to output the unlatching signal with a delay.

3. The power-supply controller circuit according to claim 2, wherein the signal delaying unit includes a resistor and a capacitor.

4. The power-supply controller circuit according to claim 3, wherein the signal delaying unit further includes a comparator.

5. The power-supply controller circuit according to claim 1, wherein the latching unit includes a transistor.

6. The power-supply controller circuit according to claim 1, wherein the latching unit is formed of a transistor.

7. The power-supply controller circuit according to claim 1, wherein the first latch includes an NPN-type transistor and a PNP-type transistor, and the second latch includes an NPN-type transistor.

8. The power-supply controller circuit according to claim 1, wherein the controller unit includes:

a signal-output portion configured to output the unlatching signal; and a signal-input portion configured to receive the ON-signal of the power-supply switch unit.

9. An image forming apparatus comprising:

a power supply;

an image forming portion configured to form an image with the power supplied from the power supply; and the power-supply controller circuit according to claim 1 to control the power supply.

10. A power-supply controller circuit comprising:

a power-supply switch unit configured to output an ON-signal when operated manually;

a switching unit configured to switch ON and OFF an output voltage to a controller unit in response to the ON-signal of the power-supply switch unit;

a latching unit configured to latch the ON-state of the switching unit, when the power-supply switch unit outputs an ON-signal under a condition where the switching unit is in the OFF-state; and a controller unit configured to control an unlatching signal to unlatch the ON-state latched by the latching unit when the latching unit is in the ON-state and detects the ON-signal sent from the power-supply switch unit, wherein the latching unit includes:

a first latch configured to latch the ON-state, the first latch configured to unlatch the on-state in response to the unlatching signal from the controller unit; and a second latch configured to work in conjunction with the power-supply switch unit in such a way as to transition to the ON state when the power-supply switch unit starts to output an ON-signal and to transition to the OFF-state when the power-supply switch unit finishes outputting the ON-signal.

11. A power-supply controller circuit comprising:

a power-supply switch unit configured to output an ON-signal when operated manually;

a switching unit configured to switch ON and OFF an output voltage to a controller unit in response to the ON-signal of the power-supply switch unit;

a latching unit configured to latch the ON-state of the switching unit, when the power-supply switch unit outputs an ON-signal under a condition where the switching unit is in the OFF-state; and a controller unit configured to control an unlatching signal to unlatch the ON-state latched by the latching unit when the latching unit is in the ON-state and detects the ON-signal sent from the power-supply switch unit, wherein the latching unit includes:

a first latch configured to latch the ON-state in response to the unlatching signal from the controller unit;

a second latch connected to the power-supply switching unit and configured to receive a latching signal output from the first latch; and a third latch connected to the power-supply switching unit and configured to receive a latching signal output from the first latch.

* * * * *